United States Patent
Nomura et al.

(10) Patent No.: US 7,784,883 B2
(45) Date of Patent: Aug. 31, 2010

(54) VEHICULAR BRAKE HYDRAULIC PRESSURE CONTROLLER

(75) Inventors: Nobuyuki Nomura, Tomi (JP); Megumu Uda, Tomi (JP)

(73) Assignee: Nissin Kogyo Co., Ltd., Nagano (JP)

( * ) Notice: Subject to any disclaimer, the term of this patent is extended or adjusted under 35 U.S.C. 154(b) by 558 days.

(21) Appl. No.: 11/761,265

(22) Filed: Jun. 11, 2007

(65) Prior Publication Data

US 2007/0284935 A1 Dec. 13, 2007

(30) Foreign Application Priority Data

Jun. 12, 2006 (JP) .......................... P.2006-162264

(51) Int. Cl.
*B60T 8/60* (2006.01)
(52) U.S. Cl. ...................................... 303/155; 701/70
(58) Field of Classification Search ................. 303/155, 303/156, 157, 158, 140, DIG. 3, DIG. 4, 303/141, 113.4; 701/70, 71
See application file for complete search history.

(56) References Cited

U.S. PATENT DOCUMENTS

| 4,538,228 | A | * | 8/1985 | Brearey et al. ................. 701/70 |
| 5,662,388 | A | | 9/1997 | Wuerth et al. |
| 6,592,192 | B1 | | 7/2003 | Kaneda et al. |
| 2007/0030618 | A1 | | 2/2007 | Heinz et al. |

FOREIGN PATENT DOCUMENTS

| DE | 4442326 | 5/1996 |
| JP | 9150727 | 6/1997 |
| JP | 10244917 | 9/1998 |
| JP | 2000016269 | 1/2000 |
| JP | 2002002462 | 9/2002 |
| WO | 2005012055 | 2/2005 |

OTHER PUBLICATIONS

Office Action of corresponding Japanese Application No. 2006-162264 and English translation thereof.
European Search Report and Written Opinion for EP 07011380 dated Oct. 25, 2007.

* cited by examiner

*Primary Examiner*—Melanie Torres Williams
(74) *Attorney, Agent, or Firm*—Roberts Mlotkowski Safran & Cole, P.C.

(57) ABSTRACT

A vehicular brake hydraulic pressure controller has a reference hydraulic pressure acquisition section 21a for acquiring hydraulic pressure achieved on the other side of an electromagnetic valve as reference hydraulic pressure, a differential pressure calculation section 21b for calculating a differential pressure Py by subtracting previously-estimated hydraulic pressure achieved on one side of the electromagnetic valve from the reference hydraulic pressure; a pressure gradient coefficient calculation section 21c for acquiring a pressure gradient coefficient K correlating with a drive current of the electromagnetic valve and the differential pressure Py, and an estimated hydraulic pressure calculation section 21e for estimating current hydraulic pressure by adding a product, which has been produced by multiplying the differential pressure Py by the pressure gradient coefficient K, to the previously-estimated hydraulic pressure achieved on one side of the electromagnetic valve.

19 Claims, 8 Drawing Sheets

FIG. 6

| CURRENT [A] | | | | | | |
|---|---|---|---|---|---|---|
| $I_1$ | TABLE 0 | DIFFERENTIAL PRESSURE Py [bar] | $X_{01}$ | $X_{02}$ | $X_{03}$ | $X_{04}$ |
| | | COEFFICIENT K [TIMES] | $Y_m$ | $Y_m$ | $Y_m$ | $Y_m$ |
| $I_2$ | TABLE 1 | DIFFERENTIAL PRESSURE Py [bar] | $X_{11}$ | $X_{12}$ | $X_{13}$ | $X_{14}$ |
| | | COEFFICIENT K [TIMES] | 0 | $Y_{12}$ | $Y_{13}$ | $Y_{14}$ |
| $I_3$ | TABLE 2 | DIFFERENTIAL PRESSURE Py [bar] | $X_{21}$ | $X_{22}$ | $X_{23}$ | $X_{24}$ |
| | | COEFFICIENT K [TIMES] | 0 | $Y_{22}$ | $Y_{23}$ | $Y_{24}$ |
| $I_4$ | TABLE 3 | DIFFERENTIAL PRESSURE Py [bar] | $X_{31}$ | $X_{32}$ | $X_{33}$ | $X_{34}$ |
| | | COEFFICIENT K [TIMES] | 0 | 0 | 0 | 0 |

(b)

VEHICULAR BRAKE HYDRAULIC PRESSURE CONTROLLER

CROSS REFERENCE TO RELATED APPLICATIONS

This application claims priority under 35 U.S.C. §119 to JP Application No. P.2006-162264, filed on Jun. 12, 2006, the contents of which are incorporated by reference in their entirety.

FIELD OF THE INVENTION

The present invention relates to a vehicular brake hydraulic pressure controller.

DESCRIPTION OF RELATED ART

A known vehicular brake hydraulic pressure controller to be mounted in an automobile, a motorcycle, and the like performs antilock brake control, traction control, skid control, brake assistance control, and the like, by adjusting magnitude of brake hydraulic pressure (hereinafter called "wheel cylinder pressure") exerted on a wheel cylinder.

It may be the case where, when the magnitude of wheel cylinder pressure is controlled, such a vehicular brake hydraulic pressure controller makes a reference to brake hydraulic pressure (hereinafter called "master cylinder pressure") arising in a master cylinder and the wheel cylinder pressure. In such a case, a hydraulic pressure sensor must be placed in a fluid circuit connecting the master cylinder to the wheel cylinder. However, in the above-described vehicular brake hydraulic pressure controller, a normally-open electromagnetic valve (an inlet valve) is positioned in the fluid circuit connecting the master cylinder to the wheel cylinder. A difference arises between an increasing (or decreasing) gradient of the brake hydraulic pressure (i.e., master cylinder pressure) of the upstream side of the inlet valve and an increasing (or decreasing) gradient of brake hydraulic pressure (i.e., wheel cylinder pressure) of the downstream side of the same. Accordingly, when a hydraulic pressure sensor is disposed at only an upstream position with reference to the inlet valve, wheel cylinder pressure must be estimated from the master cylinder pressure measured by the hydraulic pressure sensor, as described in Japanese Patent Unexamined Publication JP-A-9-150727.

The method for estimating the wheel cylinder pressure (hydraulic pressure) disclosed in JP-A-9-150727 is to determine an increasing (or decreasing) gradient of brake hydraulic pressure from a difference between the wheel cylinder pressure estimated last time and the master cylinder pressure measured by the hydraulic pressure sensor; and to add to the previously-estimated wheel cylinder pressure a product obtained as a result of the increasing (or decreasing) gradient being multiplied by a boosting (decompression) time, thereby estimating current wheel cylinder pressure.

The estimation method of JP-A-9-150727 is intended for a case where the electromagnetic valve is of ON/OFF type. Note that this ON/OFF type electromagnetic valve enables only selection between a fully-opened position and a fully-closed position. Therefore, when the electromagnetic valve is of linear solenoid type, which enables continuous adjustment of opening degree of a valve element, there arises a problem of increasing an estimation error.

The above problem is not limited to the case where wheel cylinder pressure is estimated, but also applies commonly to a case where any one hydraulic pressure (estimated hydraulic pressure) of hydraulic pressure at an upstream position with reference to the electromagnetic valve and hydraulic pressure at a downstream position with reference to the same is estimated from other hydraulic pressure (reference hydraulic pressure) when an electromagnetic valve of linear solenoid type is placed in a fluid circuit.

SUMMARY OF THE INVENTION

From such a viewpoint, one of the objects of the present invention is to provide a vehicular brake hydraulic pressure controller capable of accurately estimating, based on remaining one (reference hydraulic pressure), one (estimated hydraulic pressure) of hydraulic pressure at an upstream position with reference to an electromagnetic valve and hydraulic pressure at a downstream position when an electromagnetic valve of linear solenoid type is provided in a fluid circuit.

In order to achieve the above object, according to a first aspect of the invention, there is provided a vehicular brake hydraulic pressure controller, which calculates one of upstream hydraulic pressure and a downstream hydraulic pressure of a fluid circuit based on the other hydraulic pressure, the upstream and downstream being defined by a linear solenoid valve provided on the fluid circuit, the hydraulic pressure controller including:

a reference hydraulic pressure acquisition section that acquires the other hydraulic pressure as reference hydraulic pressure;

a differential pressure calculation section that calculates a differential pressure between the upstream hydraulic pressure and the downstream hydraulic pressure, by subtracting a previously-estimated one hydraulic pressure from the acquired reference hydraulic pressure;

a pressure gradient coefficient calculation section that calculates a pressure gradient coefficient correlating with a drive current of the linear solenoid valve and the calculated differential pressure; and an estimated hydraulic pressure calculation section that estimates the current one hydraulic pressure by adding, to the previously-estimated one hydraulic pressure, a product which has been obtained by multiplying the calculated differential pressure by the calculated pressure gradient coefficient.

Note that the upstream hydraulic pressure is pressure in a part of the fluid circuit positioned upstream side relative to the linear solenoid valve. On the other hand, the downstream hydraulic pressure is pressure in a part of the fluid circuit positioned downstream side relative to the linear solenoid valve.

According to such a vehicular brake hydraulic pressure controller, the reference hydraulic pressure acquisition section acquires the other hydraulic pressure as reference hydraulic pressure, and the differential pressure calculation section calculates a differential pressure between the upstream hydraulic pressure and the downstream hydraulic pressure, by subtracting the previously-estimated one hydraulic pressure from the acquired reference hydraulic pressure. The pressure gradient coefficient calculation section acquires a pressure gradient coefficient correlating with a drive current of the electromagnetic valve and the calculated differential pressure, and the estimated hydraulic pressure calculation section estimates current hydraulic pressure by adding, to the previously-estimated one hydraulic pressure, a product which has been produced by multiplying the calculated differential pressure by the calculated pressure gradient coefficient.

As mentioned above, in the electromagnetic valve of linear solenoid type, hydraulic pressure is estimated in consideration of a pressure gradient coefficient correlating to a drive current of an electromagnetic valve serving as an element for determination of hydraulic pressure and a calculated differential pressure. Accordingly, a vehicular brake hydraulic pressure controller which enables an improvement in the accuracy of estimation can be obtained.

According to another aspect of the invention, it is preferable that the estimated hydraulic pressure calculation section estimates the current one hydraulic pressure by multiplying the differential pressure by the pressure gradient coefficient and adding, to the previously-estimated one hydraulic pressure, a product which has been produced by further multiplying a product of multiplication by a pressure variation time.

According to such a vehicular brake hydraulic pressure controller, a differential pressure is multiplied by a pressure gradient coefficient, and a product of multiplication is further multiplied by a pressure variation time, to thus estimate hydraulic pressure. Accordingly, the pressure variation time is taken into account, and the accuracy of estimation is enhanced further.

According to still another aspect of the invention, it is preferable that the pressure gradient coefficient calculation section calculates a pressure gradient coefficient pertaining to a pressure increment gradient, and the electromagnetic valve is an inlet valve, or the pressure gradient coefficient calculation section calculates a decrement gradient coefficient pertaining to a decrement gradient, and the electromagnetic valve is an outlet valve.

According to such a brake fluid controller for a vehicle, hydraulic pressure taking into account pressure increase arising in the inlet valve can be estimated. Further, hydraulic pressure taking into account decompression arising in the outlet valve can be estimated.

According to still another aspect of the invention, it is preferable that the pressure gradient coefficient calculation section determines the pressure gradient coefficient based on a relationship between the differential pressure and the pressure gradient coefficient which has been previously determined from the drive current of the linear solenoid valve.

According to such a configuration, there is determined the pressure gradient coefficient from a relationship between the differential pressure and the pressure gradient coefficient which has been previously determined from the drive current of the electromagnetic valve. Therefore, estimation of hydraulic pressure from a characteristic of the electromagnetic valve becomes feasible, and calculation of estimated hydraulic pressure approximating to true hydraulic pressure becomes possible.

According to still another aspect of the invention, it is preferable that the pressure gradient coefficient calculation section calculates the pressure gradient coefficient in such a manner that:

setting a plurality of certain threshold current values in connection with the drive current of the electromagnetic valve;

calculating the differential pressure and the pressure gradient coefficient correlating to the differential pressure for each of the threshold current values; and interpolating the pressure gradient coefficient by using the drive current, to thereby determine the pressure gradient coefficient.

According to this configuration, a differential pressure and a pressure gradient coefficient correlating to the differential pressure can be calculated from the set threshold current values, and a pressure gradient coefficient can be determined by further interpolating the calculated pressure gradient coefficient through use of the drive current. Even when not all of preset relationships between a differential pressure and a pressure gradient coefficient are provided, an accurate pressure gradient coefficient can be acquired, and more accurate estimation of hydraulic pressure can be performed. In addition, calculation load can also be lessened, and a corresponding speed-up can be sought.

According to still another aspect of the invention, it is preferable that the pressure gradient coefficient calculation section sets the pressure gradient coefficient to a predetermined value in a neighborhood of a fully-opened position and a fully-closed position of the linear solenoid valve.

According to such a configuration, the pressure gradient coefficient is set to a predetermined value in a neighborhood of the fully-opened position and the fully-closed position of the electromagnetic valve where estimation of hydraulic pressure is less susceptible to influence. Accordingly, calculation load can be lessened correspondingly. Thereby, responsiveness at the time of brake fluid control, or the like, can be enhanced.

According to a vehicular brake hydraulic pressure controller of the present invention, when an electromagnetic valve of linear solenoid type is provided in a fluid circuit, one (estimated hydraulic pressure) of the upstream hydraulic pressure and the downstream hydraulic pressure can be estimated from the other hydraulic pressure (reference hydraulic pressure) with high accuracy.

BRIEF DESCRIPTION OF THE DRAWINGS

FIG. 6 is tables of pressure gradient coefficients, each of which correlates with a drive current of an electromagnetic valve and a differential pressure;

DETAILED DESCRIPTION OF EXEMPLARY EMBODIMENTS OF THE INVENTION EMBODIMENTS

Figure 1:
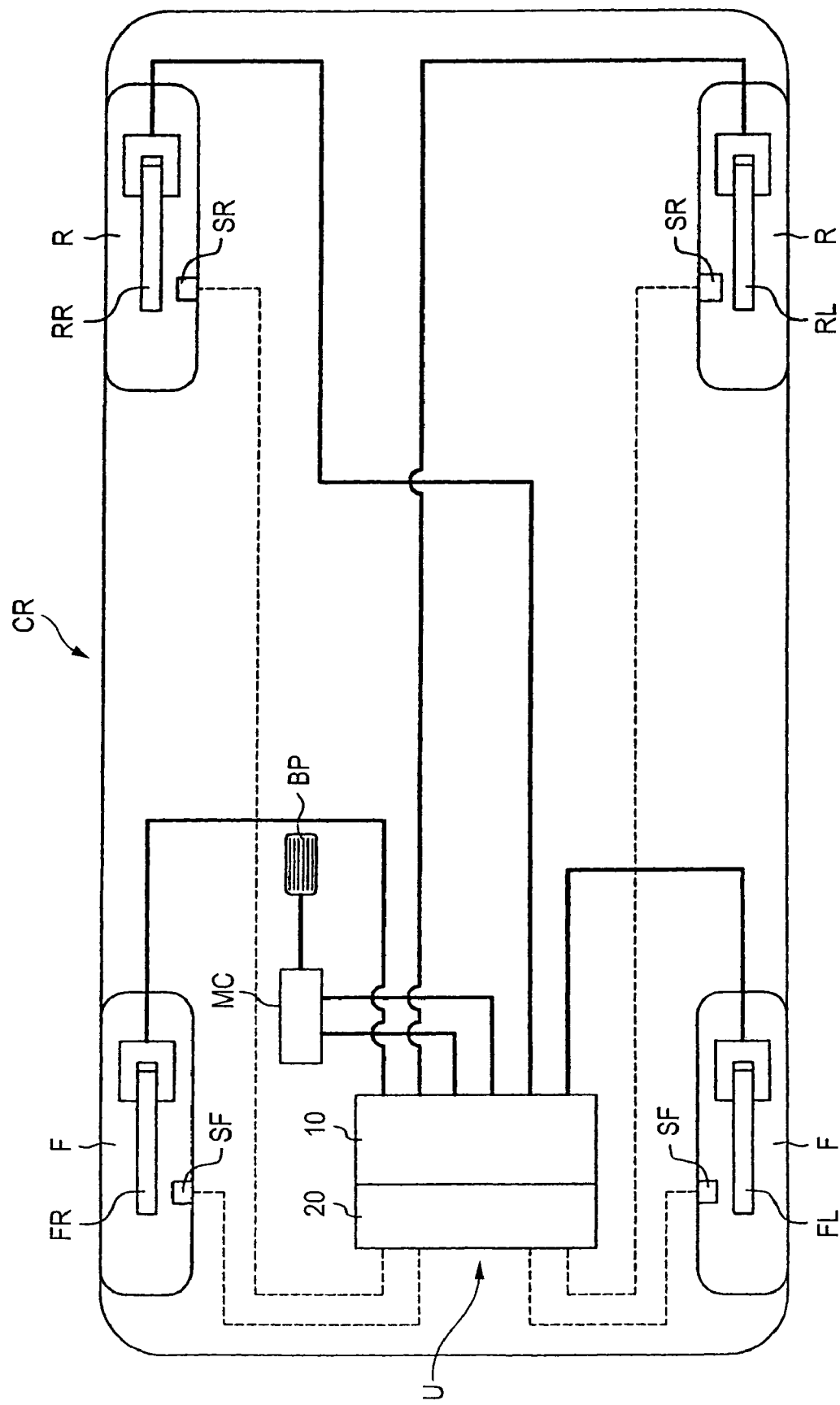
FIG. 1 is a block diagram showing a vehicle brake system having a vehicular brake hydraulic pressure controller of an embodiment of the present invention.

Embodiments of the present invention will be described in detail hereunder by reference to the accompanying drawings. Similar elements are assigned like reference numerals, and repeated explanations thereof are omitted here.

Figure 2:
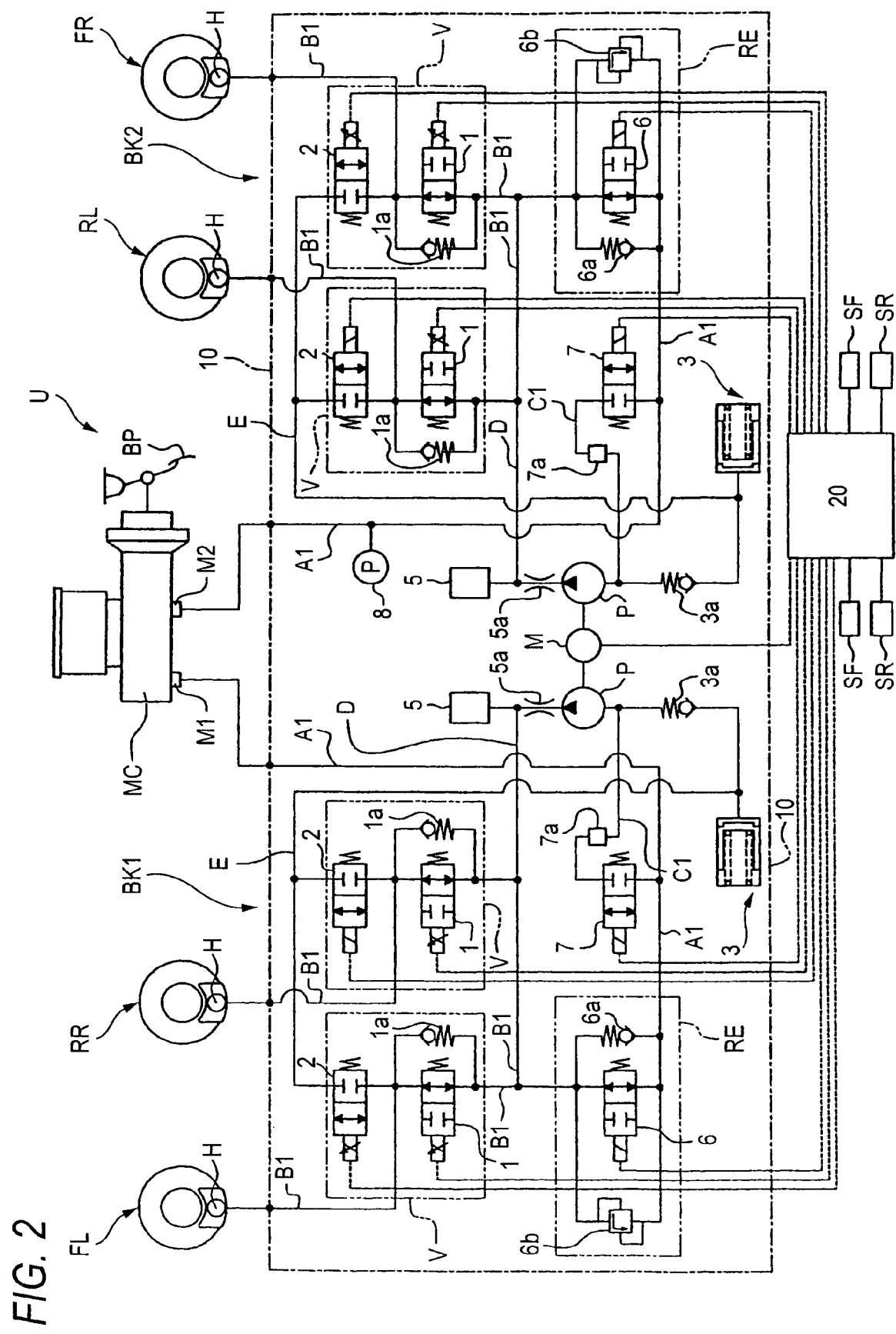
FIG. 2 is a hydraulic pressure circuit diagram of a hydraulic pressure unit.

In the drawings to which a reference is to be made, FIG. 1 is a block diagram showing a brake system of a vehicle equipped with a vehicular brake hydraulic pressure controller according to an embodiment of the present embodiment, and FIG. 2 is a hydraulic pressure circuit diagram of a hydraulic pressure unit.

As shown in FIG. 1, a vehicular brake hydraulic pressure controller U of the present embodiment performs independent antilock brake control (hereinafter called "ABS control") of wheel brakes FL, RR, RL, and FR, by controlling the magnitude of brake hydraulic pressure exerted on wheel brakes FL and FR which apply brakes to left and right front wheels F and F and on wheel brakes RL and RR which apply brakes to left and right rear wheels R and R, independently. The vehicular brake hydraulic pressure controller U has hydraulic pressure units 10, each of which is provided with various components, such as electromagnetic valves, pumps, and the like and a brake fluid circuit; and a controller 20 for controlling the various components of the hydraulic pressure units 10.

In the present embodiment, an inlet valve 1, which will be described later, of the vehicular brake hydraulic pressure controller U is equipped with an electromagnetic valve of linear solenoid type. A hydraulic pressure estimation section 21, which will be described later, of the controller 20 estimates, from brake hydraulic pressure of a master cylinder MC located upstream of this inlet valve 1, brake hydraulic pressure (estimated hydraulic pressure) of wheel cylinders to be described later.

First, the hydraulic pressure unit 10 will be described. As shown in FIG. 2, the hydraulic pressure unit 10 is interposed between the master cylinder MC serving as the hydraulic pressure source and the wheel brakes FL, RR, RL, and FR. As shown in FIG. 2, the hydraulic pressure unit 10 has a brake system BK1 for imparting braking force to two wheel brakes FL and RR of the four wheel brakes FL, RR, RL, and FR and a brake system BK2 for imparting braking force to remaining two wheel brakes FR and RL.

The master cylinder MC generates hydraulic pressure responsive to force applied to a brake pedal BP serving as a brake actuator; and has two output ports M1 and M2 in response to the two brake systems BK1 and BK2.

Since the brake systems BK1 and BK2 are substantially structurally identical to each other, explanations are herein below provided mainly to the brake system BK1, and the brake system BK2 will be described when it becomes necessary.

The brake system BK1 is provided with two control valve means V and V corresponding to the respective wheel brakes FL and RR; a reservoir 3, a dumper 5, an orifice 5a; a regulator RE; a suction valve 7; and a storage 7a. The brake system BK1 also has a common electric motor M for driving pumps P and P for the two respective brake systems BK1 and BK2. In the present embodiment, only the brake system BK2 is equipped with a pressure sensor 8.

In the following descriptions, a fluid circuit (oil passage) extending from the master cylinder MC to the control valve means V and V is referred to as an "output hydraulic pressure passage A1," and a fluid circuit extending from the control valve means V and V to the wheel brakes FL and RR is referred to as a "wheel hydraulic pressure passage B1." Moreover, a fluid circuit extending from the pump P to the output hydraulic pressure passage A1 is referred to as an "discharged hydraulic pressure passage D," and a fluid circuit extending from the control valve means V and V to the pump P is referred to as an "release passage E."

The control valve means V has the function of switching between an increasing pressure state in which an outflow of a brake fluid to the release passage E is shut off while an inflow of the brake fluid from the output hydraulic pressure passage A1 to the wheel hydraulic pressure passage B1 is allowed; a decreasing pressure state in which an outflow of the brake fluid to the release passage E is allowed while an inflow of the brake fluid from the output hydraulic pressure passage A1 to the wheel hydraulic pressure passage B1 is shut off; and a retained state in which an outflow of the brake fluid to the release passage E is shut off while an inflow of the brake fluid from the output hydraulic pressure passage A1 to the wheel hydraulic pressure passage B1 is shut off. The control valve means V is built from an inlet valve 1, an outlet valve 2, and a check valve 1a.

The inlet valve 1 is a normally-open electromagnetic valve and interposed between the master cylinder MC and respective wheel cylinders H of the wheel brakes FL and RR (i.e., between the output hydraulic pressure passage A1 and the wheel hydraulic pressure passage B1). Each of the inlet valves 1 is opened in normal times, thereby enabling transmission of brake hydraulic pressure from the master cylinder MC to each of the wheel cylinders H. The respective inlet valves 1 are closed by the controller 20 when the front wheels F and the rear wheels R come close to locking, thereby shutting off the brake hydraulic pressure applied from the master cylinder MC to the wheel brakes FL and RR.

In the present embodiment, an electromagnetic valve of linear solenoid type (linear solenoid valve) is adopted as the respective inlet valves 1, thereby realizing a configuration in which an opening amount is adjusted as a result of the controller 20 controlling a drive current A to the solenoids.

Figure 3A:
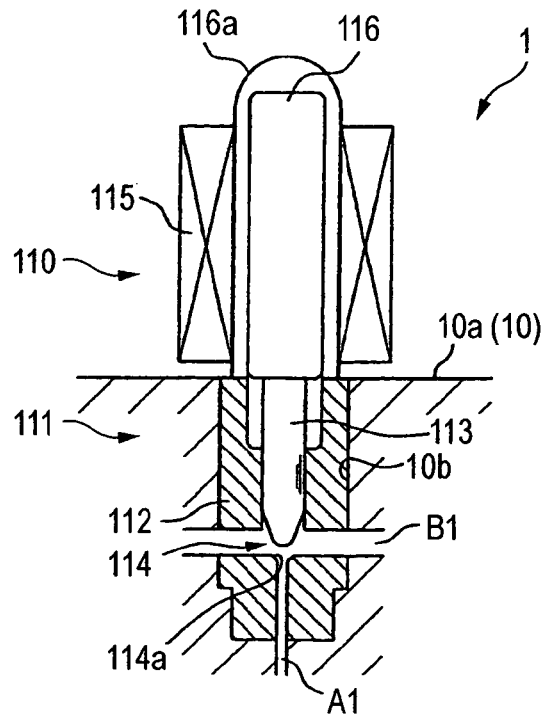
FIG. 3A is a diagrammatic cross-sectional view showing an inlet valve.

More specifically, as shown in FIG. 3A, the inlet valve 1 has a solenoid section 110 which generates electromagnetic force and a valve section 111 to be driven by this solenoid section 110. The valve section 111 is fitted in to an attachment hole 10b formed in a pump body 10a of the hydraulic pressure unit 10.

The valve section 111 has a stepped cylindrical valve housing 112 made of magnetic metal, and slidably retains a valve stem 113 made from a nonmagnetic material. A front end of the valve stem 113 is situated at a pressure chamber 114. Upon being imparted with the drive current A, the valve stem 113 performs sliding movement in an axial direction, thereby establishing or shutting off a connection between the output hydraulic pressure passage A1 remaining in mutual connection with the pressure chamber 114 and the wheel hydraulic pressure passage B1.

The solenoid section 110 principally has a core 115 and an armature 116 coupled to the valve stem 113. The core 115 is formed cylindrically and attached around a cylindrical guide sleeve 116a, which has a closed end and is formed from a magnetic material, by way of a not-shown bobbin, or the like. The armature 116 is housed in the guide sleeve 116a and can approach or depart from the core 115.

Figures 3B, 3C, 3D:
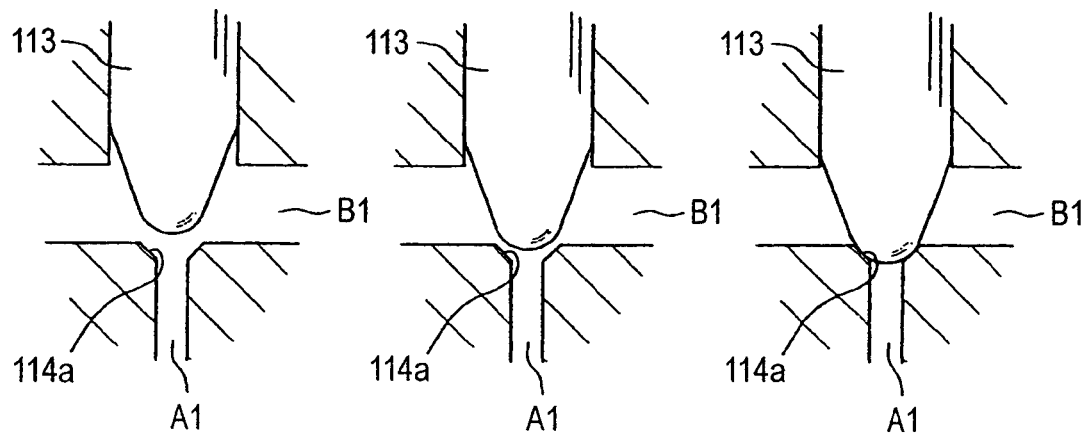
FIGS. 3B to 3D are diagrammatic views showing operation of a valve system.

The front end of the valve stem 113 is biased, by restoration force of a not-shown return spring, in a direction in which the front end is separated from a valve seat 114a. As a result, in normal times, the armature 116 is brought into contact with a not-shown contact section of the guide sleeve 116a. Specifically, in a state where magnetic attraction force toward the core 115 does not act on the armature 116, the armature 116 is situated at a position receding from the bottom side of the guide sleeve 116a by the restoration force of the not-shown return spring. As shown in FIG. 3B, the front end of the valve stem 113 comes away from the valve seat 114a. At this time, the inlet valve 1 stays open. When magnetic attraction force toward the core 115 is applied to the armature 116, the front end of the valve stem 113 approaches the valve seat 114a as shown in FIG. 3C, whereupon the inlet valve 1 is opened to a predetermined amount of aperture. Moreover, when magnetic attraction force toward the core 115 is further applied to the armature 116 until an front end of the armature 116 arrives at the valve seat 114a, the inlet valve 1 comes to close as shown in FIG. 3D.

The opening amount (the amount of lift) in such an inlet valve 1 between the valve stem 113 and the valve seat 114a changes according to a balance between a drive current A for use in applying magnetic attraction force toward the core 115 to the armature 116 and a differential pressure (Py) between upstream pressure (the output hydraulic pressure passage A1) and downstream pressure (the wheel hydraulic pressure passage B1). The opening amount can be set as appropriate by specifications of the inlet valve 1 (e.g., a fluid circuit size, a spring constant of a return spring, or the like). Descriptions about the drive current A, the differential pressure (Py), and the like, of the inlet valve 1 will be provided later.

The outlet valve 2 is an electromagnetic valve of normally-closed type and interposed between the wheel hydraulic pressure passage B1 and the release passage E. Each of the outlet valves 2 is closed in normal times. However, when the front wheels F and the rear wheels R come close to locking, the controller 20 opens the outlet valves 2 through drive control, whereby the brake hydraulic pressure applied to the wheel brakes FL and RR is released to the respective reservoirs 3.

The check valves 1a are connected in parallel to the respective inlet valves 1. The check valve 1a allows only an inflow of brake fluid from the wheel cylinder H to the master cylinder MC. Even when the inlet valve 1 is closed in a case where an input from the brake pedal BP is released, an inflow of brake fluid from the respective wheel cylinders H to the master cylinder MC is allowed.

The reservoir 3 is disposed in the release passage E and has the function of absorbing brake hydraulic pressure which escapes as a result of releasing of the respective outlet valves 2. Further, a check valve 3a for allowing only an inflow of brake fluid from the reservoir 3 to the pump P is interposed between the reservoir 3 and the pump P.

The pump P is interposed between a suctioned hydraulic pressure passage C1 connected to the output hydraulic pressure passage A1 and an discharge hydraulic pressure passage D connected to the wheel hydraulic pressure passage B1, and has the function of sucking the brake fluid stored in the reservoir 3 and discharging the brake fluid to the discharge hydraulic pressure passage D. As a result, the pressure of the output hydraulic pressure passage A1 and the pressure of the wheel hydraulic pressure passage B1, which have been decreased as a result of the brake fluid being drawn by the reservoir 3, are restored. Further, the pump P has the function of sucking the brake fluid stored in the master cylinder MC, the output hydraulic pressure passage A1, the suctioned hydraulic pressure passage C1, and the storage 7a and discharging the thus-sucked brake fluid to the discharge hydraulic pressure passage D when cut valves 6, which will be described later, shut off an inflow of brake fluid from the output hydraulic pressure passage A1 to the wheel hydraulic pressure passage B1 and suction valves 7, which will be described later, release the suctioned hydraulic pressure passage C1. As a result, when the brake pedal is not actuated, brake hydraulic pressure can be exerted on the respective wheel brakes FL, FR, RL, and RR.

The dumper 5 and the orifice 5a dampen, through synergistic operation, pulsation of the pressure of the brake fluid discharged from the pump P and pulsation induced by a regulator RE to be described later.

The regulator RE has the function of switching between a state where an inflow of brake fluid from the output hydraulic pressure passage A1 to the wheel hydraulic pressure passage B1 is allowed and a state where the inflow of brake fluid is shut off and the function of regulating the brake hydraulic pressure of the wheel hydraulic pressure passage B1 and the brake hydraulic pressure of the discharge hydraulic pressure passage D to a preset value or less when the inflow of brake fluid from the output hydraulic pressure passage A1 to the wheel hydraulic pressure passage B1 is shut off. The regulator RE is built from a cut valve 6, a check valve 6a, and a relief valve 6b.

The cut valve 6 is a normally open electromagnetic valve interposed between the output hydraulic pressure passage A1 connected to the master cylinder MC and the wheel hydraulic pressure passage B1 connected to the respective wheel brakes FL and RR. The cut valve 6 switches between a state where an inflow of brake fluid from the output hydraulic pressure passage A1 to the wheel hydraulic pressure passage B1 is allowed and a state where the inflow of brake fluid is shut off. The cut valve 6 remains open in normal times, thereby allowing transfer of brake hydraulic pressure from the master cylinder MC to the respective wheel brakes FL and RR. The cut valve 6 is closed under control of the controller 20 when the pump P is driven while the brake pedal BP is not actuated; in other words, when the brake hydraulic pressure is applied to the respective wheel brakes FL and RR while the brake pedal BP is not actuated.

The check valves 6a are connected in parallel to the respective cut valves 6. This check value 6a allows only an inflow of brake fluid from the output hydraulic pressure passage A1 to the wheel hydraulic pressure passage B1. Even when an input from the brake pedal BP is provided while the respective cut valves 6 are closed, an inflow of brake fluid from the output hydraulic pressure passage A1 to the wheel hydraulic pressure passage B1 is allowed.

The relief valves 6b are connected in parallel to the respective cut valves 6, and are opened in response to the difference between the brake hydraulic pressure of the wheel hydraulic pressure passage B1 and the brake hydraulic pressure of the discharge hydraulic pressure passage D coming to a preset value or more. The cut valves 6 and the relief valves 6b can also be embodied by a linear solenoid valve which can regulate valve opening pressure by controlling, e.g., energization of a solenoid. As mentioned above, when the linear solenoid valve is adopted as the cut valves 6 and the relief valves 6b, the hydraulic pressure of the wheel hydraulic pressure passage B1 can be regulated by opening the hydraulic pressure to the output hydraulic pressure passage A1, as required, according to a balance between the hydraulic pressure exerted on the wheel hydraulic pressure passage B1 to the regulator RE and the force that attempts to close the valve controlled by energization of the solenoid.

The suction valves 7 are normally closed electromagnetic valves provided in the suctioned hydraulic pressure passage C1 and switches between a state where the suctioned hydraulic pressure passage C1 is opened and a state where the suctioned hydraulic pressure passage C1 is closed. The suction valve 7 is released (opened) under control of the controller 20 when the cut valve 6 shuts off an inflow of brake fluid from the output hydraulic pressure passage A1 to the wheel hydraulic pressure passage B1 while the brake pedal is not actuated; in other words, when the brake hydraulic pressure is applied to the respective wheel brakes FL and RR while the brake pedal is not actuated.

The storage 7a is interposed between the pump P and the suction valve 7 within the suctioned hydraulic pressure passage C1. This storage 7a stores the brake fluid, whereby the quantity of brake fluid stored in the suctioned hydraulic pressure passage C1 is substantially increased.

The pressure sensor 8 measures the brake hydraulic pressure of the output hydraulic pressure passage A1. A result of measurement is captured by the controller 20 whenever necessary. The controller 20 determines whether or not the brake hydraulic pressure is output from the master cylinder MC; namely, whether or not the brake pedal BP is depressed. Further, antilock brake control, skid control, or the like, of a vehicle is performed in accordance with the magnitude of the brake hydraulic pressure measured by the pressure sensor 8.

Figure 4:
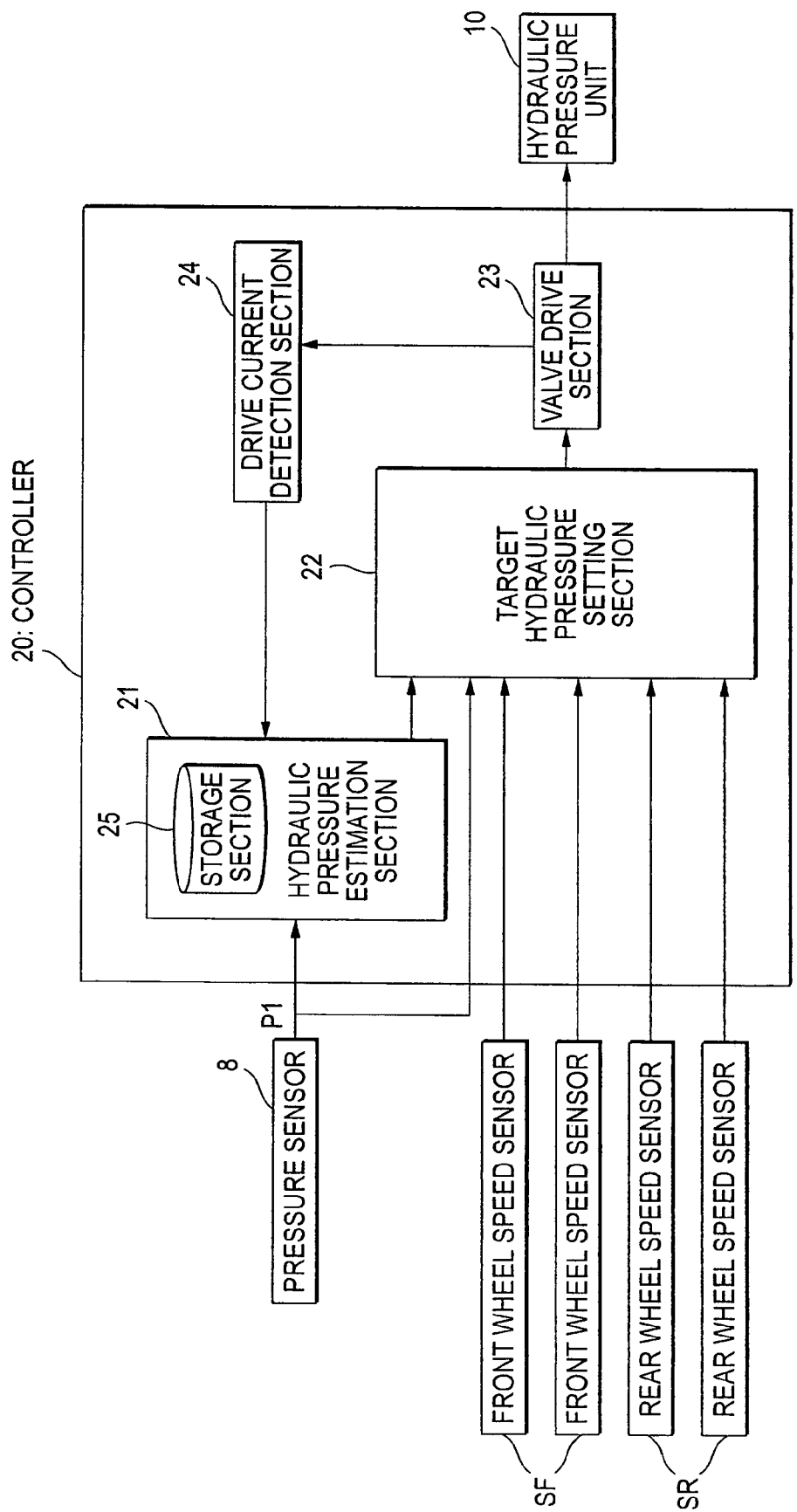
FIG. 4 is a block diagram showing the principal section of the vehicular brake hydraulic pressure controller of an embodiment of the present invention.

Subsequently, the controller 20 will be described. FIG. 4 is a block diagram showing the main section of the controller 20 of the vehicular brake hydraulic pressure controller U of the present embodiment.

As shown in FIG. 4, the controller 20 has, as functional sections, a hydraulic pressure estimation section 21, a target hydraulic pressure setting section 22, a valve drive section 23, and a drive current detection section 24.

The hydraulic pressure estimation section 21 plays the role of calculating and estimating from, the other hydraulic pressure, one of hydraulic pressure at an upstream position of the inlet valve 1 and hydraulic pressure at a downstream position of the inlet valve 1. In the present embodiment, the upstream brake hydraulic pressure (reference hydraulic pressure or the master cylinder pressure) generated by the master cylinder MC is acquired from the pressure sensor 8, to thus estimate the brake hydraulic pressure (wheel cylinder pressure) exerted on the respective wheel cylinders H of the downstream wheel breaks FL and RR.

Figure 5:
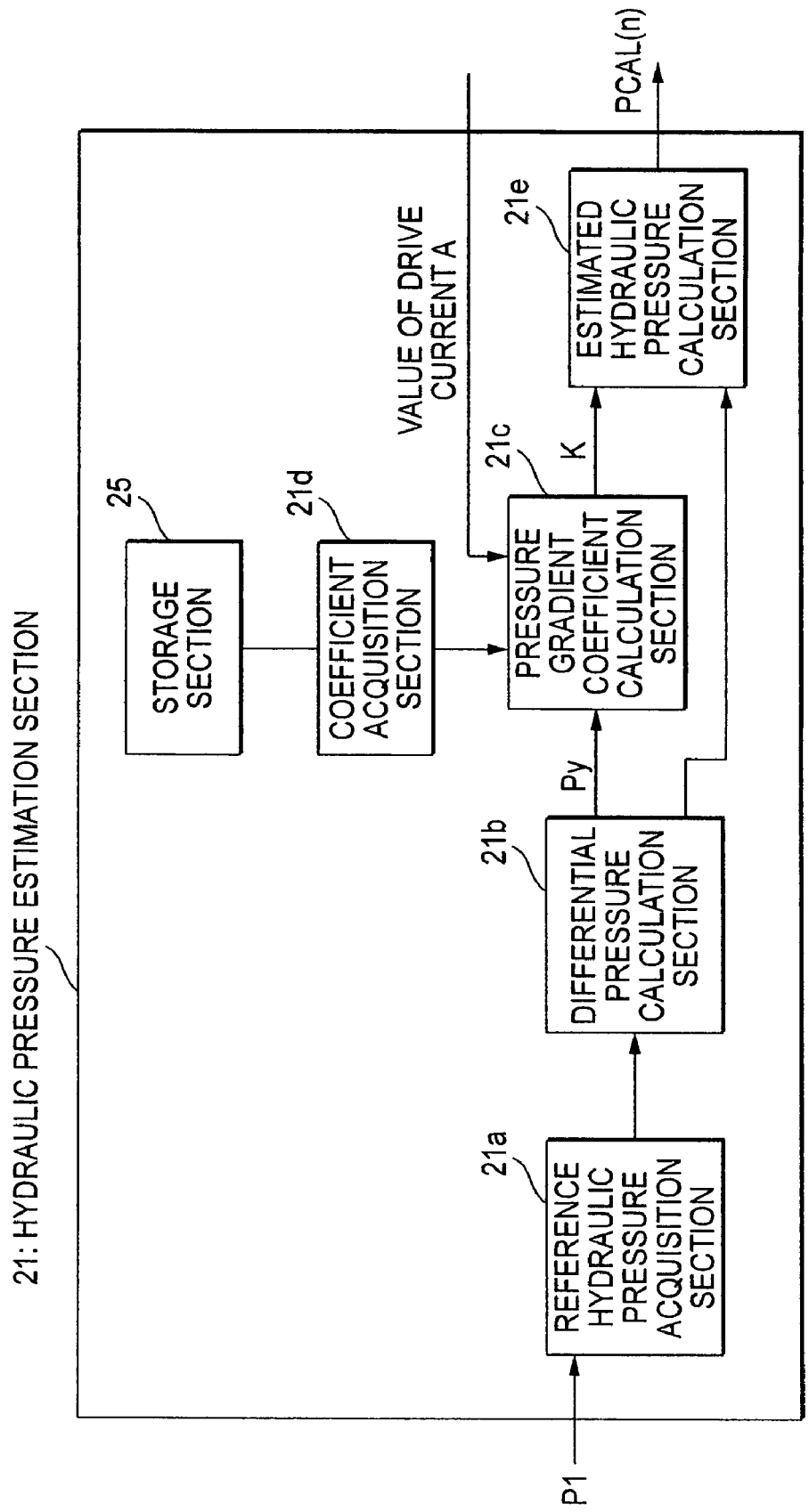
FIG. 5 is a block diagram showing details of a hydraulic pressure estimation section.

As shown in FIG. 5, the hydraulic pressure estimation section 21 further includes, as detail functional sections, a reference hydraulic pressure acquisition section 21a, a differential pressure calculation section 21b, a pressure gradient coefficient calculation section 21c, a coefficient acquisition section 21d, an estimated hydraulic pressure calculation section 21e, and a storage section 25.

The reference hydraulic pressure acquisition section 21a acquires reference hydraulic pressure P1 from the pressure sensor 8. From the reference hydraulic pressure P1, the hydraulic pressure estimation section 21 estimates wheel cylinder pressure of the respective wheel brakes FL and RR. A method for estimating the wheel cylinder pressure of the wheel brake FL and a method for estimating the wheel cylinder pressure of the wheel brake RR are identical with each other. In the following descriptions, a case where wheel cylinder pressure of the wheel cylinder H of the wheel brake FL is estimated from reference hydraulic pressure P1 will be explained.

The differential pressure calculation section 21b calculates a differential pressure Py between hydraulic pressure at an upstream position of the inlet valve 1 and hydraulic pressure at a downstream position of the inlet valve 1, by subtracting the previously-estimated hydraulic pressure PCAL(n−1) of the wheel cylinder H of the wheel brake FL from the acquired reference hydraulic pressure P1. For instance, differential pressure Py is calculated by the next expression:

$$Py = P1 - PCAL(n-1) \qquad (1)$$

Note that (n−1) subsequent to a variable, such as PCAL, shows a result of previous calculation, and (n) shows a result of current calculation.

The pressure gradient coefficient calculation section 21c inputs a value of the drive current A for the inlet valve 1 and the calculated differential pressure Py, thereby acquiring a pressure increment gradient coefficient K correlating with the value of the drive current A and the differential pressure. In the present embodiment, the coefficient acquisition section 21d acquires a pressure increment gradient coefficient (a pressure gradient coefficient) K by reference to a table previously stored in the storage section 25.

The table stored in the storage section 25 is shown in, e.g., FIG. 6. As shown in FIG. 6, the storage section 25 stores Tables 0 to 3 which associate the drive current A (described simply as "current A" in the drawing) with the differential pressure Py and the pressure increment gradient coefficient K (described simply as "coefficient K" in the drawing and hereinafter called a "coefficient K") corresponding to the drive current A. In FIG. 6, the drive current A exhibits a relationship of $I_1 < I_2 < I_3 < I_4$; the differential pressure Py exhibits a relationship of $X_{01} < X_{02} < X_{03} < X_{04}$, a relationship of $X_{11} < X_{12} < X_{13} < X_{14}$, a relationship of $X_{21} < X_{22} < X_{23} < X_{24}$, and a relationship of $X_{31} < X_{32} < X_{33} < X_{34}$. Further, the coefficient K exhibits a relationship of $Y_{12} < Y_{13} < Y_{14}$ and a relationship of $Y_{22} < Y_{23} < Y_{24}$.

Tables 0 to 3 are described in more detail by reference to the tables shown in FIG. 6. In Table 0 where the drive current A assumes an extremely small value $I_1 A$, Ym is associated as a coefficient K with all differential pressures $X_{01}$ to $X_{04}$ bar. Specifically, in a state where the drive current A is extremely small and the inlet valves 1 come into fully open, the coefficient K is set uniformly to Ym regardless of the magnitude of the differential pressure Py. In contrast, in Table 3 where the drive current A assumes an extremely large value $I_4 A$ and where the inlet valves 1 come into fully open, a value of 0 is associated as the coefficient K with all of differential pressures $X_{31}$ to $X_{34}$ bar.

In a range (a range indicated by reference symbol "b" in FIG. 6) which is equal to or less than valve-opening differential pressures at respective current values (threshold current values), a value of 0 is associated as the coefficient K. The reason for this is that, in terms of design of the inlet valve 1, the valve is closed rather than opening of the valve being commenced in the range that is equal to or less than the valve-opening differential pressure.

Specifically, for example, when the drive current A of the inlet valve 1 is $I_3 A$ and the calculated differential pressure Py is $X_{22}$ bar, a coefficient $K = Y_{22}$ is acquired by reference to Table 2 in FIG. 6.

Now, when the drive current A of the inlet valve 1 and the calculated differential pressure Py assume values which are not associated with Tables 0 through 3 shown in FIG. 6, a plurality of certain threshold current values are set in connection with the drive current A of the inlet valve 1, as will be described later. A differential pressure Py and a coefficient K correlating with the differential pressure Py (corresponding to a "coefficient α and coefficient β" provided below) are calculated for each of the threshold current values. These differential pressures and the coefficients are further interpolated by use of the drive current A, to thus determine the coefficient K.

For example, when the acquired drive current A of the inlet valve 1 corresponds to $I_B A$ which is greater than $I_2 A$ and smaller than $I_3 A$ and the differential pressure Py corresponds to $X_A$ bar, interpolation retrieval is performed by making a reference to Table 1 associated with the drive current $I_2 A$ and $I_3 A$ and Table 2 associated with the drive current $I_2 A$ and $I_3 A$.

When the differential pressure $X_A$ bar is determined to be greater than, e.g., $X_{11}$ bar and smaller than, e.g., $X_{12}$ bar, by reference to Table 1, a coefficient K associated with $X_{11}$ bar is 0, and a coefficient K associated with $X_{12}$ bar is $Y_{12}$. Hence, a coefficient α can be determined through interpolation retrieval through Table 1 and by the following equation.

$$\text{Coefficient } \alpha = (Y_{12} - 0)/(X_{12} - X_{11}) \times (X_A - X_{11}) + 0$$

Next, when the differential pressure $X_A$ bar is determined to be greater than, e.g., $X_{22}$ bar and smaller than, e.g., $X_{23}$ bar, by reference to Table 2, a coefficient K associated with $X_{22}$ bar is $Y_{22}$, and a coefficient K associated with $X_{23}$ bar is $Y_{23}$. Hence, a coefficient β can be determined through interpolation retrieval through Table 2 and by the following equation.

Coefficient $β=(Y_{23}-Y_{22})/(X_{23}-X_{22})×(X_A-X_{22})+Y_{22}$

The thus-obtained coefficients α and β are further interpolated by the drive current A, to thus determine a coefficient K. Specifically, the coefficient K to be determined is derived as follows.

Coefficient K=(coefficient β−coefficient α)/$(I_3-I_2)$×$(I_B-I_2)$+coefficient α

Next, the estimated hydraulic pressure calculation section 21e adds a product, which has been obtained by multiplying the calculated differential pressure Py by the acquired coefficient K, to the previously-estimated hydraulic pressure PCAL (n−1) of the wheel cylinder H, thereby calculating the current estimated hydraulic pressure PCAL(n). The estimated hydraulic pressure PCAL(n) can be determined by the following expression.

$$PCAL(n)=PCAL(n-1)+K×Py \quad (2)$$

The thus-calculated estimated hydraulic pressure PCAL (n) is output to the target hydraulic pressure setting section 22.

The estimated hydraulic pressure calculation section 21e may also multiply the differential pressure Py by the coefficient K, and further multiply the thus-obtained result by a pressure increase time T (a pressure variation time of the present invention), to thus obtain a product. The product may be added to the previously-estimated hydraulic pressure PCAL(n−1), thereby calculating the current estimated hydraulic pressure PCAL(n). In this case, the estimated hydraulic pressure PCAL(n) can be determined by the following expression.

$$PCAL(n)=PCAL(n-1)+K×T×Py \quad (3)$$

By such estimation of hydraulic pressure, the differential pressure Py is multiplied by the coefficient K, and a result of multiplication is further multiplied by the pressure increase time T, to thus estimate hydraulic pressure. Since the pressure increase time T is taken into account, the accuracy of estimation is enhanced.

The target hydraulic pressure setting section 22 inputs the reference hydraulic pressure P1 detected by the pressure sensor 8, the rotational speed of the front wheels F detected by a wheel speed sensor SF of the front wheels F, the rotational speed of the rear wheels R detected by a wheel speed sensor SR of the rear wheels R, the hydraulic pressure PCAL(n) estimated by the hydraulic pressure estimation section 21, and the like; and sets, in accordance with these inputs, target hydraulic pressure for the front wheels F and the rear wheels R at the time of antilock brake control, or the like. The setting can be performed by a known method, and no specific limitations are imposed on the method. The thus-set target hydraulic pressure is output to the valve drive section 23.

The valve drive section 23 outputs to the hydraulic pressure unit 10 a pulse signal which activates the respective inlet valves 1 and the outlet valves 2 provided in the hydraulic pressure unit 10 by a known method, in such a way that hydraulic pressure of the respective wheel cylinders H coincides with target hydraulic pressure set by the target hydraulic pressure setting section 22. This pulse signal can be arranged, for instance, in such a manner that a larger number of pulses are output as a differential pressure between the estimated current hydraulic pressure PCAL(n) of the respective wheel cylinders H and target hydraulic pressure becomes greater.

Figure 7:
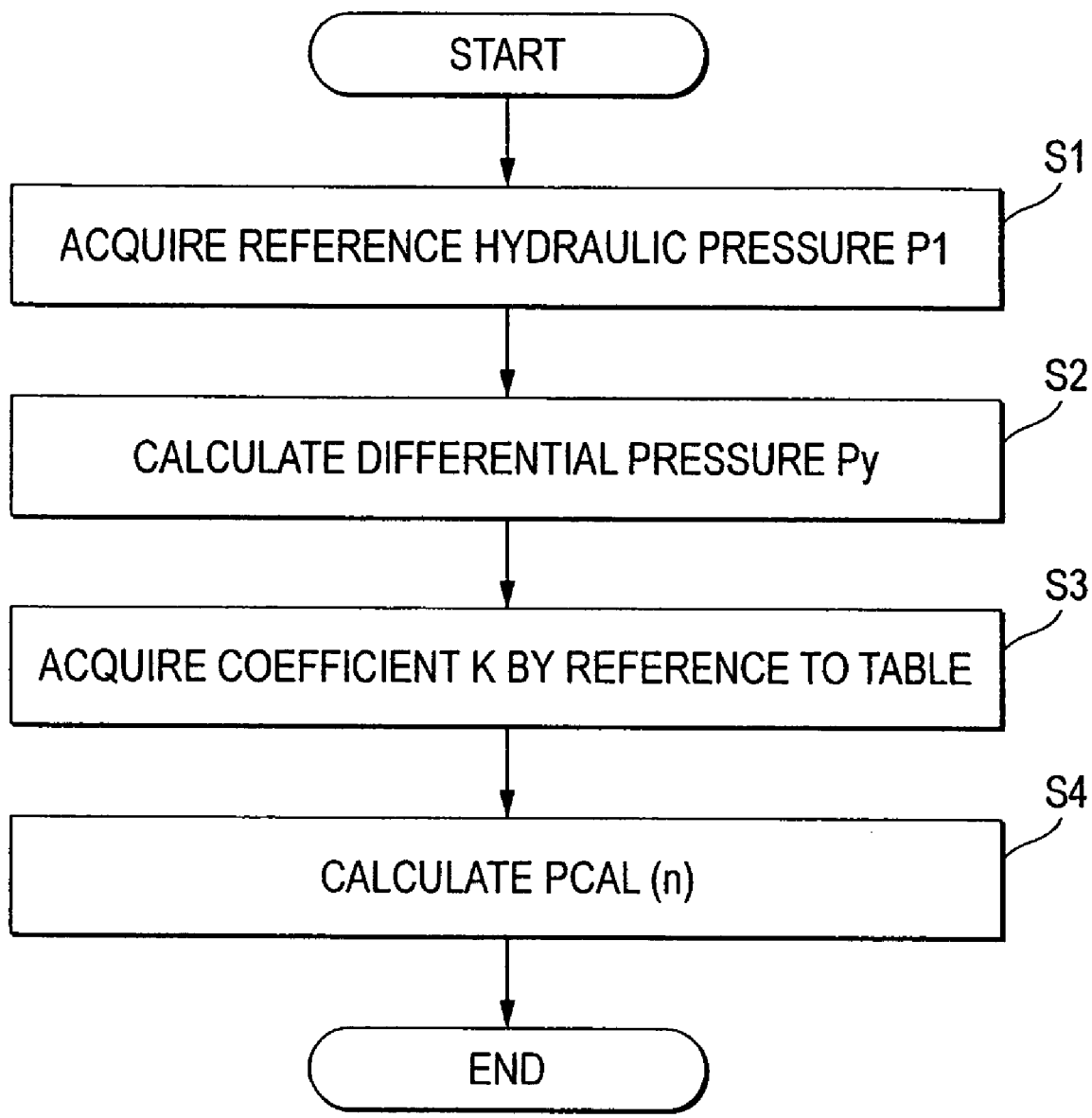
FIG. 7 is a flowchart showing processing of a hydraulic pressure estimation section.

The drive current detection section 24 detects the drive currents A of the respective inlet valves 1 activated in response to a pulse signal output from the valve drive section 23; and feeds back the thus-detected drive currents A to the hydraulic pressure estimation section 21 so as to be used in calculation performed by the hydraulic pressure estimation section 21, Operation for estimating hydraulic pressure performed in a vehicular brake hydraulic pressure controller U, as mentioned above, will be described by reference to FIGS. 5 and 7. FIG. 7 is a flowchart showing processing of the hydraulic pressure estimation section 21.

When, during driving of a vehicle CR (see FIG. 1), there has arisen a necessity for estimating hydraulic pressure PCAL(n) of the wheel cylinder H of the wheel brake FL of the front wheel F (see FIG. 2, and the same also applies to counterparts in the following descriptions) in order to perform; for instance, smooth antilock brake control, the pressure sensor 8 first detects the master cylinder pressure (reference hydraulic pressure P1) of the master cylinder MC connected to this wheel cylinder H, and the reference hydraulic pressure acquisition section 21a of the hydraulic pressure estimation section 21 acquires the thus-detected pressure (S1).

The acquired reference hydraulic pressure P1 is input to the differential pressure calculation section 21b, and the differential pressure calculation section 21b subtracts the previously-estimated hydraulic pressure PCAL(n−1) of this wheel cylinder H from the acquired reference hydraulic pressure P1, thereby calculating a differential pressure Py between the pressure at the upstream position with reference to the inlet valve 1 and the pressure at the downstream position with reference to the same; namely, a differential pressure Py between the reference hydraulic pressure P1 and the previously-estimated hydraulic pressure PCAL(n−1) of the wheel cylinder H (S2). The thus-calculated differential pressure Py is output to the pressure gradient coefficient calculation section 21c.

Subsequently, the value of the drive current A of the inlet valve 1 is input to the pressure gradient coefficient calculation section 21c, and a reference is made to Table 0 through Table 3 previously stored in the storage section 25 by way of the coefficient acquisition section 21d, whereby the coefficient K correlating with the drive current A and the differential pressure Py is acquired (S3). When the input drive current A and the calculated differential pressure Py assume numerical values which are not associated with Table 0 through Table 3 stored in the storage section 25, a plurality of certain threshold current values are set in connection with the drive current A as mentioned previously. A differential pressure Py and a coefficient K (a coefficient α and a coefficient β) correlating with the differential pressure Py are calculated for each of the threshold current values, and they are interpolated by use of the drive current A, to thus determine the coefficient K.

Subsequently, the estimated hydraulic pressure calculation section 21e adds a product, which has been produced by multiplying the differential pressure Py by the acquired coefficient K, to the previously-estimated hydraulic pressure PCAL(n−1) of the wheel cylinder H, thereby determining the current estimated hydraulic pressure PCAL(n) (S4).

Figure 8:
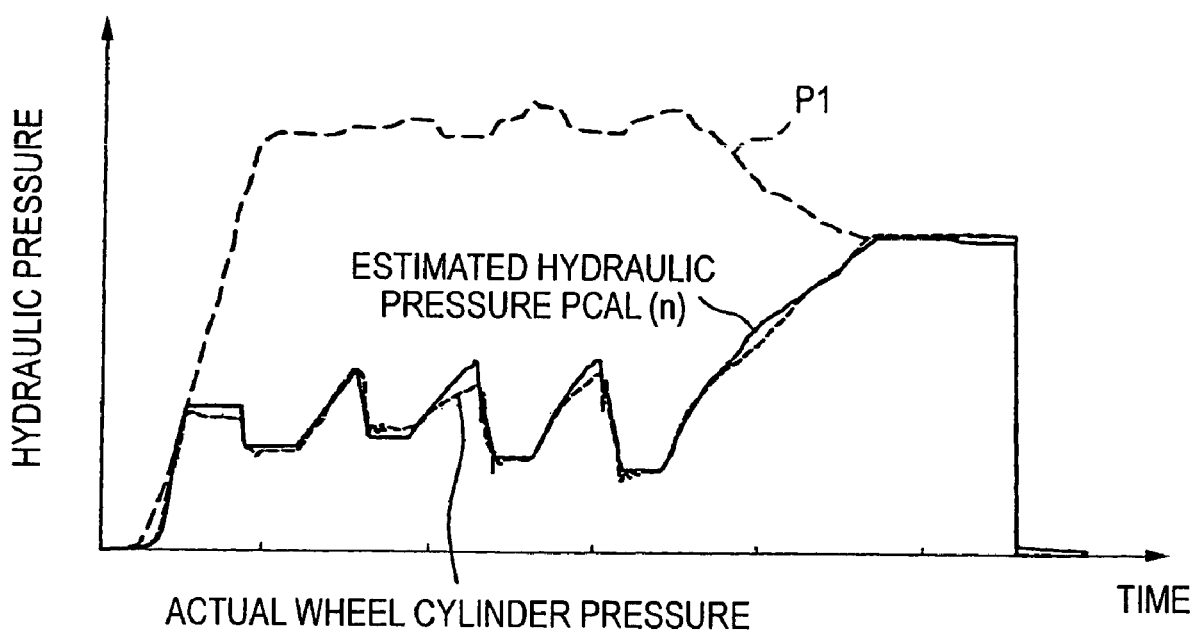
FIG. 8 is a graph showing an example result of estimation.

The current estimated hydraulic pressure PCAL(n) estimated by such a technique is obtained at the time of, e.g., antilock brake control, as a value expressed by a line drawing of a graph indicated by a solid line in FIG. 8. At this time, a not-shown hydraulic pressure sensor is placed in a fluid circuit connected to this wheel cylinder H, and actual wheel cylinder pressure is measured. A change in wheel cylinder pressure determined from the measured values is illustrated by a dotted line in FIG. 8. As is evident from FIG. 8, a value of hydraulic pressure PCAL(n) estimated by the vehicular brake hydraulic pressure controller U of the present embodiment follows a considerable change in the pressure of the wheel cylinder H at the time of antilock brake control and is obtained as a value which is essentially the same as the actually-measured value of pressure of the wheel cylinder H.

As mentioned above, in the vehicular brake hydraulic pressure controller U of the present embodiment, brake hydraulic pressure is estimated in consideration of the coefficient K correlating with the drive current A of the inlet valve 1 of linear solenoid type, serving as an element for determination of hydraulic pressure, and the calculated differential pressure Py. Hence, the accuracy of estimation can be enhanced.

The pressure gradient coefficient calculation section 21c determines a coefficient K from a relationship between coefficients K and differential pressures Py previously determined from the drive current A of the inlet valve 1. Hence, estimation taking into account a characteristic of the inlet valve 1 becomes feasible, and calculation of estimated hydraulic pressure comparatively close to true hydraulic pressure becomes possible.

Further, when the input drive current A and the calculated differential pressure Py are numerals which are not associated with Tables 0 through 3 stored in the storage section 25, the pressure gradient coefficient calculation section 21c sets a plurality of certain threshold current values in connection with the drive current A; calculates a differential pressure Py and a coefficient K correlating with the differential pressure Py for each of the threshold current values; and further interpolates the thus-calculated differential pressures Py and the coefficients K through use of the drive current A, thereby determining a coefficient K. Accordingly, even when not all of the preset relationships between the differential pressure Py and the coefficient K are provided, an accurate coefficient K can be acquired, and more accurate hydraulic pressure can be estimated.

Moreover, the calculation load can be lessened, and a corresponding speedup can be sought.

Moreover, at the fully-opened position, the pressure gradient coefficient calculation section 21c sets the coefficient K to a given value (see, e.g., Ym in FIG. 6). Further, at the fully-closed position, the pressure gradient coefficient calculation section 21c sets the coefficient K to 0. Hence, the calculation load stemming from the coefficient K can be lessened correspondingly. Thereby, responsiveness achieved at the time of brake hydraulic pressure control, such as antilock brake control or the like, can be enhanced. Alternatively, there may also be adopted a configuration in which the coefficient K is set to a predetermined value in the neighborhood of the fully-opened position or fully-closed position of the inlet valve 1 where estimation of hydraulic pressure is less susceptible to influence.

In the present embodiment, the inlet valve 1 is embodied as an electromagnetic valve of linear solenoid type and configured so as to estimate hydraulic pressure. However, the inlet value is not limited to this configuration. An electromagnetic valve of linear solenoid type may also be adopted for the outlet valve 2, and there may be calculated a differential pressure Py between the pressure at an upstream position with reference to the outlet valve 2 and the pressure at a downstream position with reference to the same, thereby estimating hydraulic pressure achieved when the wheel cylinder H is decompressed.

In this case, the outlet valve 2 is embodied as an electromagnetic valve of normally-closed type. Hence, a table associating a drive current A, a differential pressure Py corresponding to the drive current A, and a decrement gradient coefficient K' is stored in the storage section 25, and the pressure gradient coefficient calculation section 21c makes a reference to this table.

Moreover, the hydraulic pressure of the reservoir 3 may also be used as hydraulic pressure at the downstream position with reference to the outlet valve 2, and a reservoir pressure sensor may also be provided for detecting this hydraulic pressure. Alternatively, the hydraulic pressure of the reservoir 3 may also be assumed to be 0.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicular brake hydraulic pressure controller, which calculates one of upstream hydraulic pressure and a downstream hydraulic pressure of a fluid circuit based on the other hydraulic pressure, the upstream and downstream being defined by a linear solenoid valve provided on the fluid circuit, the hydraulic pressure controller comprising:
a reference hydraulic pressure acquisition section that acquires the other hydraulic pressure as reference hydraulic pressure;
a differential pressure calculation section that calculates a differential pressure between the upstream hydraulic pressure and the downstream hydraulic pressure, by subtracting a previously-estimated one hydraulic pressure from the acquired reference hydraulic pressure;
a pressure gradient coefficient calculation section that calculates a pressure gradient coefficient correlating with a drive current of the linear solenoid valve and the calculated differential pressure; and
an estimated hydraulic pressure calculation section that estimates the current one hydraulic pressure by adding, to the previously-estimated one hydraulic pressure, a product which has been obtained by multiplying the calculated differential pressure by the calculated pressure gradient coefficient.

2. The vehicular brake hydraulic pressure controller according to claim 1, wherein
the estimated hydraulic pressure calculation section estimates the current one hydraulic pressure by multiplying the differential pressure by the pressure gradient coefficient and adding, to the previously-estimated one hydraulic pressure, a product which has been produced by further multiplying a product of multiplication by a pressure variation time.

3. The vehicular brake hydraulic pressure controller according to claim 1, wherein
the pressure gradient coefficient calculation section calculates a pressure gradient coefficient pertaining to a pressure increment gradient, and
the electromagnetic valve is an inlet valve.

4. The vehicular brake hydraulic pressure controller according to claim 1, wherein
the pressure gradient coefficient calculation section calculates a decrement gradient coefficient pertaining to a decrement gradient, and
the electromagnetic valve is an outlet valve.

5. The vehicular brake hydraulic pressure controller according to claim 1, wherein
the pressure gradient coefficient calculation section calculates a pressure gradient coefficient pertaining to a pressure increment gradient and a pressure gradient coefficient pertaining to a decrement gradient, respectively, and
the electromagnetic valve corresponds to an inlet valve and an outlet valve.

6. The vehicular brake hydraulic pressure controller according to claim 1, wherein
the pressure gradient coefficient calculation section determines the pressure gradient coefficient based on a relationship between the differential pressure and the pressure gradient coefficient which has been previously determined from the drive current of the linear solenoid valve.

7. The vehicular brake hydraulic pressure controller according to claim 1, wherein
the pressure gradient coefficient calculation section calculates the pressure gradient coefficient in such a manner that:
setting a plurality of certain threshold current values in connection with the drive current of the electromagnetic valve;
calculating the differential pressure and the pressure gradient coefficient correlating to the differential pressure for each of the threshold current values; and
interpolating the pressure gradient coefficient by using the drive current, to thereby determine the pressure gradient coefficient.

8. The vehicular brake hydraulic pressure controller according to claim 1, wherein
the pressure gradient coefficient calculation section sets the pressure gradient coefficient to a predetermined value in a neighborhood of a fully-opened position and a fully-closed position of the linear solenoid valve.

9. The vehicular brake hydraulic pressure controller according to claim 1, wherein the reference hydraulic pressure is a master cylinder hydraulic pressure obtained from a sensor.

10. The vehicular brake hydraulic pressure controller according to claim 9, wherein previously-estimated one hydraulic pressure is a wheel cylinder hydraulic pressure.

11. The vehicular brake hydraulic pressure controller according to claim 1, wherein differential pressure Py is calculated by:

$$Py = P1 - PCAL(n-1)$$

wherein P1 is the reference hydraulic pressure, (n−1) shows a result of previous calculation, (n) shows a result of a current calculation and PCAL is a variable.

12. The vehicular brake hydraulic pressure controller according to claim 1, wherein the pressure gradient coefficient calculation section inputs a value of the drive current for the linear solenoid valve which is an inlet valve.

13. The vehicular brake hydraulic pressure controller according to claim 12, wherein the pressure gradient coefficient calculation section acquires a pressure increment gradient coefficient K correlating with the linear solenoid valve of the drive current and the differential pressure.

14. The vehicular brake hydraulic pressure controller according to claim 13, wherein the pressure increment gradient coefficient K is obtained by reference to a table previously stored in a storage section.

15. The vehicular brake hydraulic pressure controller according to claim 14, wherein the table stores values which associate the drive current with the differential pressure and the pressure increment gradient coefficient K corresponding to the drive current.

16. The vehicular brake hydraulic pressure controller according to claim 13, wherein, in a state where the drive current is small and the inlet valve is fully open, the pressure increment gradient coefficient K is set uniformly to Ym regardless of a magnitude of the differential pressure.

17. The vehicular brake hydraulic pressure controller according to claim 13, wherein when the drive current assumes a large value and where the inlet valve is fully open, a value of 0 is associated as the pressure increment gradient coefficient K.

18. The vehicular brake hydraulic pressure controller according to claim 13, wherein in a range which is equal to or less than valve-opening differential pressures at respective threshold current values, a value of 0 is associated as the pressure increment gradient coefficient K.

19. The vehicular brake hydraulic pressure controller according to claim 13, wherein the differential pressure and the pressure increment gradient coefficient K correlating with the differential pressure are calculated for each of the threshold current values, and further interpolated by use of the drive current to determine the pressure increment gradient coefficient K.

* * * * *